United States Patent [19]

Bevilaqua et al.

[11] Patent Number: 4,645,140
[45] Date of Patent: Feb. 24, 1987

[54] NOZZLE SYSTEM

[75] Inventors: Paul M. Bevilaqua, Dublin; John H. Dehart, Powell, both of Ohio

[73] Assignee: Rockwell International Corporation, El Segundo, Calif.

[21] Appl. No.: 524,481

[22] Filed: Aug. 18, 1983

[51] Int. Cl.⁴ .................. B64C 21/04; B64D 33/04
[52] U.S. Cl. ............................ 244/12.1; 244/207; 244/53 R; 239/265.11; 239/601; 239/592; 60/269
[58] Field of Search .............. 244/53 R, 73 R, 74, 244/207, 12.1, 23 R, 15, 52, 12.5, 23 D; 181/220, 213; 239/265.11, 265.25, 265.19, 265.35, 601; 60/269, 271

[56] References Cited

U.S. PATENT DOCUMENTS

| | | | |
|---|---|---|---|
| D. 190,373 | 5/1961 | Huthsing | 239/601 |
| 1,493,280 | 5/1924 | Rees | 244/52 |
| 2,973,922 | 3/1961 | Davidson | 244/207 |
| 3,027,713 | 4/1962 | Tyler et al. | 239/265.11 |
| 3,288,377 | 11/1966 | Van De Roer | 239/592 |
| 3,428,257 | 2/1969 | Kentfield et al. | 239/265.35 |
| 3,730,292 | 5/1973 | MacDonald | 239/265.11 |
| 4,311,291 | 1/1982 | Gilbertson et al. | 239/265.19 |

FOREIGN PATENT DOCUMENTS

| | | | |
|---|---|---|---|
| 681058 | 7/1966 | Belgium | 244/12.5 |
| 2121486 | 12/1971 | Fed. Rep. of Germany | 244/207 |
| 605331 | 5/1960 | Italy | 239/592 |

OTHER PUBLICATIONS

Butz, Jr. "NACA Studies Ways to Soften Jet Noise", Aviation Week, 11-4-57, pp. 73, 75 and 77.

Primary Examiner—Galen Barefoot
Attorney, Agent, or Firm—Charles T. Silberberg; Chris Papageorge

[57] ABSTRACT

A nozzle system for providing improved thrust augmentation for an aircraft lift and/or propulsion system is provided. The unique nozzle structure is designed such that counter-rotating vortices emanate from the nozzle tips. When this unique nozzle configuration is combined with simple slot nozzles in a specific manner a vortex rich flow will result. When a diffuser is placed around this unique combination such that jet pumping is obtained, significant improvement in thrust augmentation is realized from the vortex rich flow mixing with the coflowing secondary air stream.

12 Claims, 7 Drawing Figures

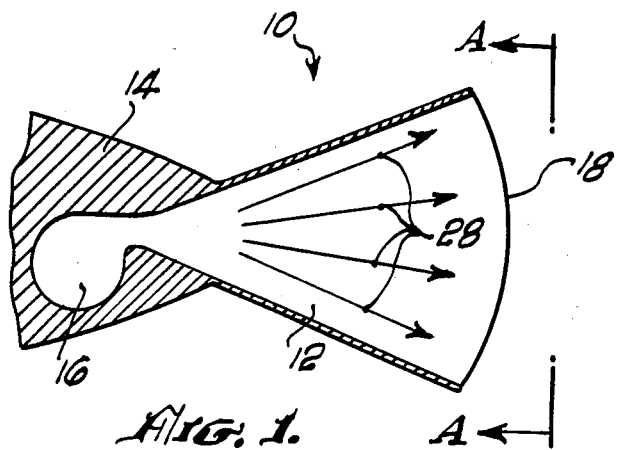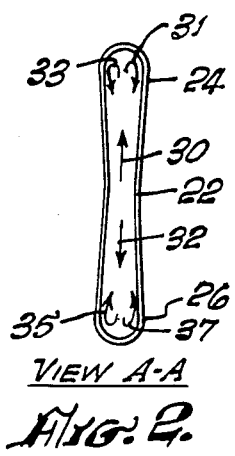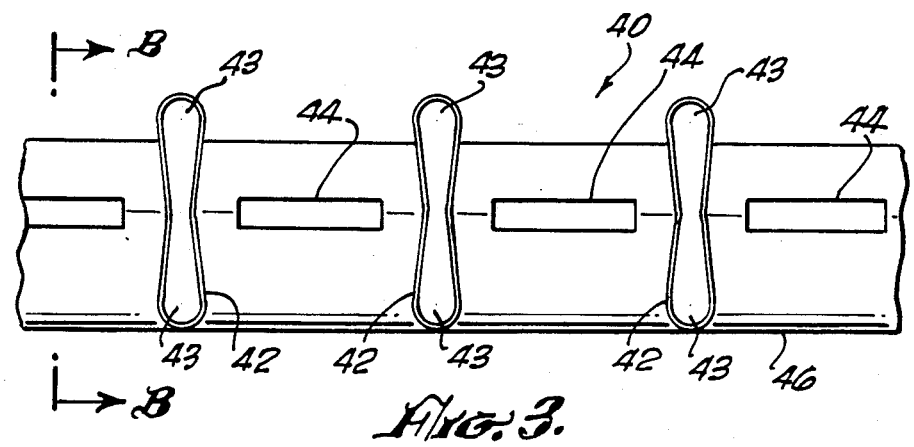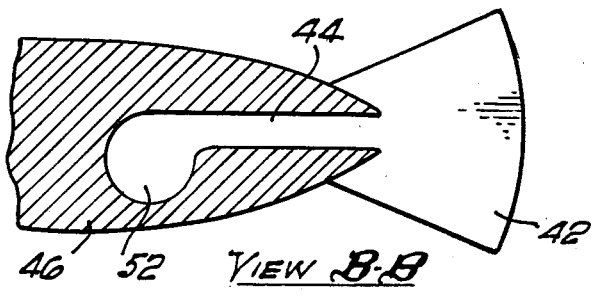

NOZZLE SYSTEM

BACKGROUND OF THE INVENTION

1. Field of the Invention

This invention pertains to a nozzle system for improving the thrust augmentation of a lift or propulsion device. It can optimally be used to improve the mixing with a secondary coflowing air stream.

2. Description of the Prior Art

According to the laws of momentum and energy conservation, improved lift or thrust can be obtained by accelerating a large mass of air to a low velocity. A well-known example of this principle is in the jet engines that propel the transport aircraft used by airlines. Almost all airlines use what is known as a fan jet or a forward fan engine. This essentially uses a multivane shrouded propeller external to the turbojet engine but powered by the turbojet engine. This device accelerates a large mass of air to a low velocity and therefore enhances the engine thrust. In an application of the present invention, a large mass of air is entrained through a diffuser by vortex rich air mixing with the secondary coflowing stream. The vortex rich air results from the unique nozzle configuration.

A nozzle structure is described in U.S. Pat. No. 4,311,291 to Gilbertson, et. al. that contains notches along the rear edge of the nozzle configuration. This has the effect of widening the jet stream while directing the jet stream rearwardly. The advantage of this type of nozzle structure would be found in a blown flap system. A flap increases lift by increasing the local velocity on the upper surface of a flap. This type of system is usually used in short take off and landing (STOL) aircraft. This type of system is not addressed in the present invention.

Typer, et. al. in U.S. Pat. No. 3,027,713 uses a slotted nozzle for noise suppression. This type of slotted nozzle reduces the engine noise at the expense of reducing the thrust.

A lobe mixer for gas turbine engines is described by Wynosky, et. al. in U.S. Pat. No. 4,149,375 to both suppress the noise and minimize the thrust loss. This is accomplished by mixing the fan flow stream with the engine flow stream by scalloping the side walls of the mixer which produces vortex sheets. This apparently enhances the mixing which minimizes the thrust loss and simultaneously suppresses the noise.

Papworth in U.S. Pat. No. 4,015,613 uses a nozzle shaped as a bowtie for cleaning tanks. This is completely unrelated art.

Kentfield, et. al. discloses a jet engine exhaust nozzle for VTOL aircraft in U.S. Pat. No. 3,428,257 where the turbulence of the exhaust gases passing through said nozzle is minimized by use of a bowtie shaped structure internal to the nozzle.

Lehman in U.S. Pat. No. 3,258,916 describes a means for vehicular steering using jet propulsion principles. In one of his embodiments, he changes a jet stream from an oval into a cross slot outlet. However, there is no mention of vortices.

SUMMARY OF THE INVENTION

It is an object of this invention to provide an improved nozzle structure that will produce a vortex rich flow.

It is a further object of this invention to provide a fan shaped nozzle whose exit resembles a bowtie shape.

It is another object of this invention to provide a nozzle whose flow will produce counter-rotating vortices at the tips.

It is yet another object of this invention to provide a combination of vertical and horizontal nozzles that will yield a turbulent flow.

It is still another object of this invention to provide a nozzle configuration in combination with a diffuser that will yield efficient entrainment and produce significant thrust augmentation.

Briefly, in accordance with this invention, there is provided an improved nozzle structure whose flow pattern at the tips yield counter-rotating vortices. When the improved nozzle structure is used as a vertical cross slot nozzle in conjunction with a horizontal span slot nozzle and placed in a diffuser, the improved mixing which entrains the gas in the diffuser provides significantly improved thrust.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

BRIEF DESCRIPTION OF THE DRAWINGS

FIG. 1 is a cross section view showing a flared nozzle with a curved exit profile.

FIG. 2 is an end view of FIG. 1 showing a bowtie exit configuration.

FIG. 3 is a elevation view of a wing trailing edge employing a combination of vertical cross slot nozzles and horizontal span slot nozzles.

FIG. 4 is a cross section view showing the cross slot and span slot nozzles of FIG. 3.

Figure 5:
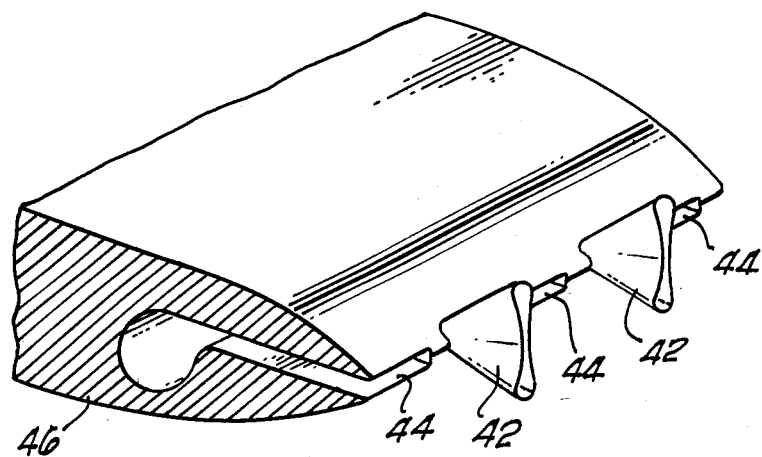
FIG. 5 is a perspective view showing the cross slot and span slot nozzles of FIG. 3.

While the invention will be described in connection with the preferred embodiment, it will be understood that it is not intended to limit the invention to that embodiment. On the contrary, it is intended to cover all alternatives, modifications, and equivalents that may be included within the spirit and scope of the invention as defined by the appended claims.

DETAILED DESCRIPTION OF THE INVENTION

Referring now to FIG. 1 generally shown as 10 is a flared nozzle 12 connected to a body 14, which could be the center body of a VTOL wing (not shown) or the aft end of an aircraft wing. A supply of pressurized gas is pumped through duct 16 to nozzle 12. Nozzle 12 has a curved (convex) exit profile 18, for reasons which shall be discussed.

FIG. 2, illustrates an exit view of a bow-tie shaped nozzle 10 showing a center portion 22 and tips 24 and 26 with arcuate ends. As the pressurized gas passes through duct 16 and into nozzle 12, the gas expands and flows towards exit 18. This is shown by flow lines 28. When the gas flow reaches the center portion 22, which is thinner than tip portions 24 and 26, the gas tends to flow from the center portion 22 toward the tips 24 and 26. This is indicated by flow lines 30 and 32.

Figure 7:
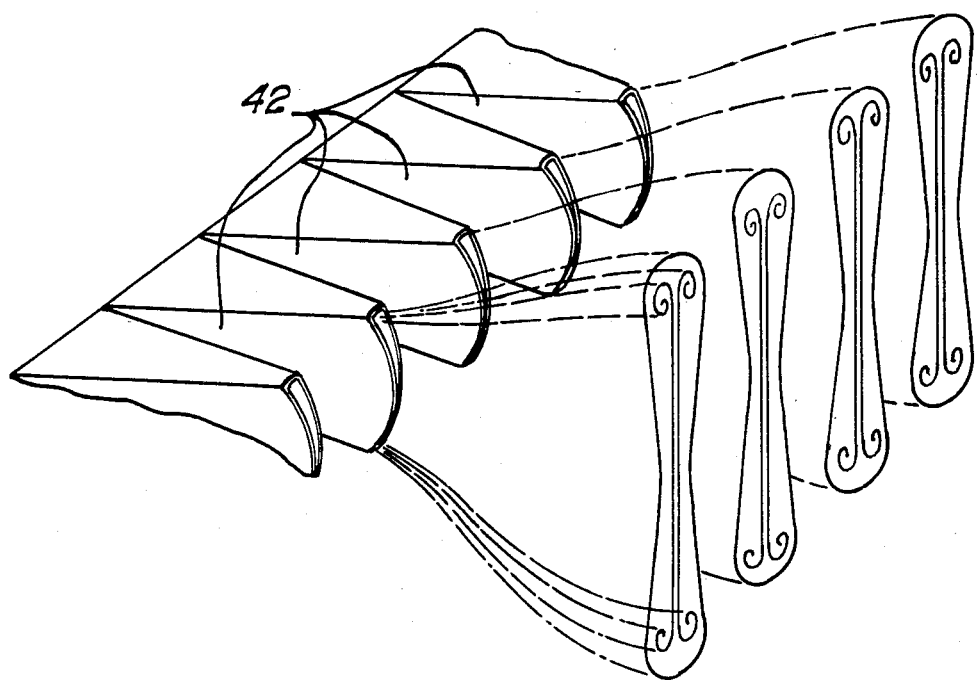
FIG. 7 is a perspective view of cross slot nozzles of FIGS. 1 and 2 mounted in a wing showing counter-rotating vortices produced by the flow.

As the gas flows toward tips 24 and 26, it directs itself towards the center of the arcuate tips 24 and 26. Due to the circular configuration of tips 24 and 26, the gas is rotated in a right hand and left hand pattern, i.e. as shown by arrows 31, 33, 35, and 37. At the same time longitudinal flow 28 in the outer edges of the nozzle 12 mixes with the flow 30 and 32 and produces counter-rotating vortices in the area immediately aft of the nozzle. An example of this flow pattern is shown in FIG. 7. In order to improve gas flow mixing aft of the nozzle, a wedge shaped exit profile (not shown) was first tested. However, using a wedge profile also decreases the jet thrust since the thrust vector is tilted off the jet axis for the entire contour. A goal of the present invention is to maximize the mixing, while minimizing the associated thrust loss. The present nozzle which has curved convex exit profile 12 accomplishes maximum mixing at minimum thrust loss by optimizing the angular distribution of the jet deflection. Since the vortices form at the arcuate tips, a large deflection angle is preferred at the tips to provide the maximum mixing by injecting the vortices at the tips at an angle to the main stream. Conversely, the center of the jet contributes very little to the vortex formation so that a small deflection angle is preferred at that point (to retain optimal thrust direction). Tests of the bowtie shaped nozzle with the curved exit showed that it did indeed meet the objective of good mixing with small thrust losses.

Referring to FIG. 3, a wing trailing edge generally shown at 40, shows a nozzle exit view of vertical cross slots 42 and horizontal span slots 44. The vertical cross slots 42 have been fully described with the previous discussion of FIG. 1 and FIG. 2. The horizontal span slots 44 have no protruding nozzle from the aircraft body or wing 46 and have essentially a rectangular exit opening.

FIG. 4 is a cross section view B—B of FIG. 3. This shows a cross slot 42 and horizontal span slot 44 along with body or aircraft wing 46. Also shown is duct 52, where a supply of pressurized gas is pumped to nozzles 42 and 44. The configuration shown in FIG. 3 and FIG. 4, provides good turbulent mixing of the jet stream from nozzles 42 and 44. This turbulent mixing is prevalent because of the counter-rotating vortices at the arcuate tips 43 shown in FIG. 3. The vortex rich turbulent mix again maximizes mixing while minimizing the associated thrust loss.

FIG. 5 shows a perspective view of a section of body or wing 46 with vertical cross slots 42 and horizontal span slots 44.

Figure 6:
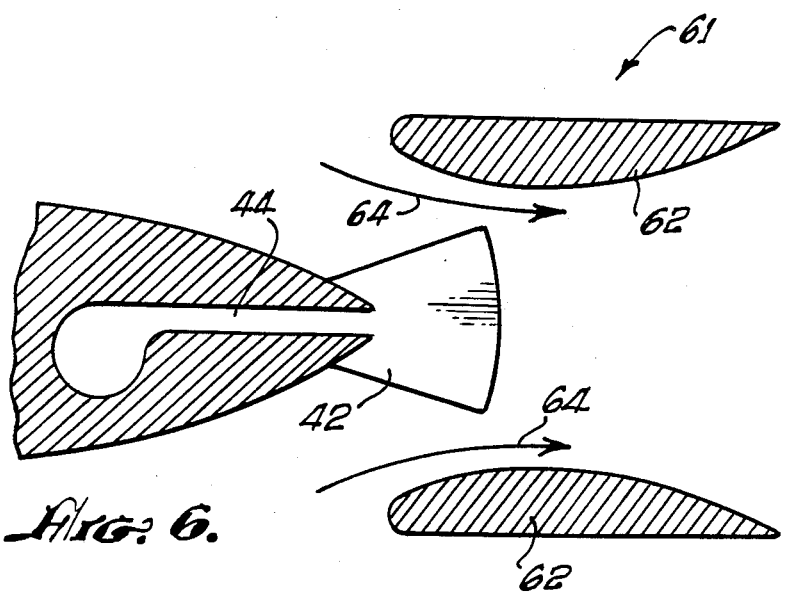
FIG. 6 is a cross section view showing a combination of a nozzle and a diffuser.

FIG. 6 shows a section view of the configuration as described in FIG. 5 in conjunction with a diffuser generally shown at 61 with flap members 62. Vertical cross slots 42 and horizontal span slots 44 are located such that the pressurized gas flows into the throat of diffuser 62. The combination of nozzles (injectors), such as described above, and a diffuser is commonly called an "ejector". Within an ejector, thrust is increased by transferring the kinetic energy of the pressurized gas exiting from nozzles 42 and 44 to a large mass of air drawn from the atmosphere (secondary fluid flow), which is represented by lines 64. The mechanism of this energy transfer is the turbulent mixing of the two streams. Thus increases in ejector thrust augmentation can be obtained by increasing the turbulent mixing rate. Appreciable increases in mixing and augmentation have been achieved with the vertical cross slot nozzles 42 intermixed with the horizontal cross span nozzles 44. The vortices emanating from the vertical cross slot nozzles 42 is shown in FIG. 7. These vortices serve to accelerate the turbulent mixing and thereby entrain additional gas into the ejector.

The amount of thrust augmentation ($\phi$) by the present invention is determined from test data and defined as:

$$\phi = (T/\dot{M}V)$$

Where
T = Total Measured Thrust
$\dot{M}$V = Isentropic Jet Thrust

Several parameters in the design of the configuration presented in FIG. 6 will affect the amount of thrust augmentation obtainable. The jet deflection angle of the curved vertical cross slot nozzle 42 is the angle of flow from the centerline of the jet stream. Preferably, this should be no greater than 28 degrees (on each side of the centerline). However, it has been determined that the preferred jet deflection angle should be approximately 21 degrees. The bowtie ratio of the vertical cross slot nozzle which also affects thrust augmentation $\phi$ is defined as the ratio of the nozzle thickness at the tips to the nozzle thickness at the centerline. This ratio can range between 1.5 and 3.0 and produce good strong vortices. The preferred bowtie ratio is approximately 2.5. A third parameter that can affect thrust augmentation $\phi$ is the horizontal span slot aspect ratio which is the ratio of the length of the horizontal span slot 44 to the thickness or height of the horizontal span slot 44 and can range from 6 to 14 for acceptable results. The preferred horizontal span aspect ratio is approximately 10 for greatest thrust augmentation.

Another parameter that affects thrust augmentation $\phi$ is the horizontal span slot 44 to vertical cross slot 42 flow split. The flow split is defined as the ratio of the total horizontal span slot flow area to the total flow area. Obviously, a valving means would be used relative to duct 52 to effect a flow split. A 100 percent flow split would indicate an all horizontal span slot configuration while a 0 percent flow split would be an all vertical cross slot nozzle configuration. Thrust augmentation ratio $\phi$ with an all horizontal span slot configuration was the worst case. Flow splits between 0 percent and 50 percent produces acceptable results, i.e. there is little effect on thrust augmentation $\phi$.

Ulitizing the configuration of FIG. 6, the thrust augmentation $\phi$ was substantially optimized through an itterative experimental process where one parameter was varied while all other design parameters were held constant. The parameters of the preferred embodiment of the present invention obtained by this process have been defined above. A configuration designed by utilizing these parameters, when tested, produced a peak thrust augmentation ratio of 1.64.

Thus, it is apparent that there has been provided, in accordance with the invention, a nozzle system that fully satisfies the objectives, aims, and advantages set forth above. While the invention has been described in conjunction with specific embodiments thereof, it is evident that many alternatives, modifications, and variations will be apparent to those skilled in the art in light of the aforegoing description. Accordingly, it is intended to embrace all such alternatives, modifications, and variations what fall within the spirit and scope of the appended claims.

What is claimed is:

1. A lift and/or propulsion system for an aircraft having wings, comprising:
    (a) supply means for supplying pressurized gas; and
    (b) nozzle connected with said supply means having a nozzle exit for directing said gas rearwardly of said nozzle to produce the jet stream, said nozzle exit comprising a plurality of horizontal span slots and a plurality of vertical cross slots, said horizontal span slots and said vertical cross slots being distinct from each other, said vertical cross slots having an exit profile which is substantially curved so that the portion of each of said plurality of vertical slots which is approximately horizontally in alignment with the centerline of the jet stream is more rearward than the upper and lower portions of said each vertical slot, said cross slots having a bowtie shape in cross section such that the width of the cross slots increases outwardly from the centerline of the jet stream to the tips of each cross slot so that the central portion of said cross slots are constricted relative to said tips, said tips having an arcuate shape, said horizontal span slots having a substantially straight exit profile and having a gap of substantially uniform width, said vertical cross slots and said horizontal span slots being adjacent to each other and spaced spanwise along the wings said span slots being in substantially lateral alignment with the central constricted portions of said cross slots whereby the jet stream flowing from said vertical cross slots has counterrotating vortices emanating only from each of said arcuate tips, the counterrotating vortices counterrotating about axes which are generally parallel to the direction of jet stream flow, and whereby the jet stream flow from said vertical cross slots combines with the jet stream flow from said horizontal span slots to form vortex enriched flow.

2. The system as described in claim 1 wherein said horizontal span slots are spaced substantially equally and are alternated with said vertical cross slots, said vertical cross slots also being spaced substantially equally.

3. The system as described in claim 2 wherein the flow angle of said gas within said vertical cross slots can vary up to 28 degrees on each side of the centerline.

4. The system as described in claim 3 wherein said vertical cross slots have a bowtie ratio which is between 1.5 and 3.0.

5. The system as described in claim 4 wherein said horizontal span slots have an aspect ratio which is between 6 and 14.

6. The system of claim 1 wherein said vertical cross slots and said horizontal span slots are positioned along the trailing edge of the wings.

7. The system of claim 5 wherein said vertical cross slots and said horizontal span slots are positioned along the trailing edge of the wings.

8. The system as described in claim 7 wherein the jet stream flow from the vertical cross slots and the jet stream flow from the horizontal span slots are in the ratio of no greater than 1.0.

9. The system of claim 1 also including:
    a diffuser with an inlet for secondary fluid flow, a throat, and a diffuser exit, said nozzle exit positioned in said throat of said diffuser such that said diffuser receives the jet stream, said inlet being approximately adjacent to said nozzle exit such that secondary fluid will be entrained in the jet stream, whereby the vortex enriched flow mixes with the secondary fluid flow producing substantially improved thrust augmentation.

10. The system of claim 2 also including:
    a diffuser with an inlet for secondary flow, a throat, and a diffuser exit, said nozzle exit positioned in said throat of said diffuser such that said diffuser receives the jet stream, said inlet being approximately adjacent to said nozzle exit such that secondary fluid will be entrained in the jet stream, whereby the vortex enriched flow mixes with the secondary fluid flow producing substantially improved thrust augmentation.

11. The system of claim 6 also including:
    a diffuser with an inlet for secondary flow, a throat, and a diffuser exit, said nozzle exit positioned in said throat of said diffuser such that said diffuser receives the jet stream, said inlet being approximately adjacent to said nozzle exit such that secondary fluid will be entrained in the jet stream, whereby the vortex enriched flow mixes with the secondary fluid flow producing substantially improved thrust augmentation.

12. The system of claim 8 also including:
    a diffuser with an inlet for secondary flow, a throat, and a diffuser exit, said nozzle exit positioned in said throat of said diffuser such that said diffuser receives the jet stream, said inlet being approximately adjacent to said nozzle exit such that secondary fluid will be entrained in the jet stream, whereby the vortex enriched flow mixes with the secondary fluid flow producing substantially improved thrust augmentation.

* * * * *